United States Patent
Smirin

(10) Patent No.: US 10,755,373 B2
(45) Date of Patent: *Aug. 25, 2020

(54) METHOD, DEVICE, AND MEDIUM FOR SEARCHING AND ROUTING GEOGRAPHICALLY-POSITIONED ENTITIES VIA A GRAPHICAL USER INTERFACE

(71) Applicant: GT Gettaxi Limited, Limassol H.E. (CY)

(72) Inventor: Shahar Smirin, Jerusalem (IL)

(73) Assignee: GT Gettaxi Limited, Limassol H.E. (CY)

( * ) Notice: Subject to any disclaimer, the term of this patent is extended or adjusted under 35 U.S.C. 154(b) by 623 days.

This patent is subject to a terminal disclaimer.

(21) Appl. No.: 15/332,798

(22) Filed: Oct. 24, 2016

(65) Prior Publication Data
US 2017/0053371 A1    Feb. 23, 2017

Related U.S. Application Data

(63) Continuation of application No. 14/046,837, filed on Oct. 4, 2013, now Pat. No. 9,477,983, which is a
(Continued)

(51) Int. Cl.
*G06Q 30/00* (2012.01)
*G06Q 50/30* (2012.01)
(Continued)

(52) U.S. Cl.
CPC ........... *G06Q 50/30* (2013.01); *G06F 3/0482* (2013.01); *G06F 3/04817* (2013.01);
(Continued)

(58) Field of Classification Search
CPC ................................................ G06Q 30/0641
(Continued)

(56) References Cited

U.S. PATENT DOCUMENTS

D615,100 S    5/2010 Canu-Chiesa
D625,733 S    10/2010 Anzures
(Continued)

FOREIGN PATENT DOCUMENTS

WO    WO-2012143302 A1 * 10/2012 ............. G08G 1/202

OTHER PUBLICATIONS

Clark, Nick, Cabbies launch service to hail a cab with two taps of smartphone, Oct. 31, 2011, The Independent (Year: 2011).*
(Continued)

*Primary Examiner* — Brittney N Miller
(74) *Attorney, Agent, or Firm* — Lowenstein Sandler LLP

(57) ABSTRACT

Implementations of the disclosure describe searching and routing geographically-positioning entities via a graphical user interface (GUI). A method includes transmitting, via the communication session, a first packet comprising first data indicative of a geographic location of the client computing device, receiving a second packet comprising second data indicative of a locations of geographically-positioned entities, rendering, via a display device, a GUI comprising a map of a geographical area inclusive of the geographic location of the client computing device, transforming the first data into a first coordinate representative of the geographic location of the client computing device on the map, transforming the second data into other coordinates representative of the geographic locations of the geographically-positioned entities on the map, presenting, via the GUI, a first icon at the first coordinate on the map, and presenting, via the GUI, additional icons at the other coordinates on the map.

20 Claims, 11 Drawing Sheets

Related U.S. Application Data continuation-in-part of application No. 29/420,159, filed on May 4, 2012, now Pat. No. Des. 725,133.

(60) Provisional application No. 61/710,589, filed on Oct. 5, 2012.

(51) Int. Cl.
  *G06Q 30/06* (2012.01)
  *G06Q 10/02* (2012.01)
  *G06F 3/0481* (2013.01)
  *G06F 3/0482* (2013.01)

(52) U.S. Cl.
  CPC ......... *G06Q 10/02* (2013.01); *G06Q 30/0639* (2013.01); *G06Q 30/0641* (2013.01)

(58) Field of Classification Search
  USPC ....................................................... 705/27.1
  See application file for complete search history.

(56) References Cited

U.S. PATENT DOCUMENTS

| | | | |
|---|---|---|---|
| D631,060 S | 1/2011 | Flik et al. | |
| D634,332 S | 3/2011 | van der Spek | |
| D637,196 S | 5/2011 | Ray et al. | |
| D644,658 S | 9/2011 | Lemay | |
| D713,415 S | 9/2014 | Lee et al. | |
| D714,813 S | 10/2014 | Oda et al. | |
| D716,327 S | 10/2014 | Schoger et al. | |
| D716,328 S | 10/2014 | Schoger et al. | |
| 2003/0025719 A1 | 2/2003 | Palmer et al. | |
| 2008/0091342 A1* | 4/2008 | Assael | G01C 21/3438 701/533 |
| 2008/0155475 A1 | 6/2008 | Duhig | |
| 2011/0138275 A1 | 6/2011 | Yu | |
| 2011/0313804 A1 | 12/2011 | Camp et al. | |
| 2011/0313880 A1 | 12/2011 | Paul et al. | |
| 2013/0116967 A1 | 5/2013 | Akcasu et al. | |
| 2014/0026065 A1 | 1/2014 | Wang | |
| 2014/0051465 A1 | 2/2014 | Ruys et al. | |

OTHER PUBLICATIONS

USPTO, Office Action for U.S. Appl. No. 14/046,837, dated Oct. 15, 2015.

USPTO, Final Office Action for U.S. Appl. No. 14/046,837, dated Apr. 6, 2016.

USPTO, Notice of Allowance for U.S. Appl. No. 14/046,837, dated Jun. 29, 2016.

USPTO, Notice of Allowance for U.S. Appl. No. 29/420,159, dated Nov. 17, 2014.

Clark, Nick, "Cabbies launch service to hail a cab with two taps of smartphone", Oct. 31, 2011, The Independent, 2 pages.

\* cited by examiner

METHOD, DEVICE, AND MEDIUM FOR SEARCHING AND ROUTING GEOGRAPHICALLY-POSITIONED ENTITIES VIA A GRAPHICAL USER INTERFACE

RELATED APPLICATIONS

This application is a continuation of U.S. Non-Provisional patent application Ser. No. 14/046,837, filed Oct. 4, 2013, which claims the benefit of U.S. Provisional Application No. 61/710,589, filed Oct. 5, 2012, and which is a continuation-in-part of U.S. Design patent application No. 29/420,159 (Issued on Mar. 24, 2015 as U.S. Design Pat. No. D725133), filed on May 4, 2012. The contents of the above-referenced applications are hereby incorporated by reference in their entireties.

TECHNICAL FIELD

Embodiments of the present disclosure relate to computing devices and graphical user interfaces of the computing devices, and more specifically, to searching and routing geographically-positioning entities via a graphical user interface (GUI).

BACKGROUND

Computing systems may execute applications (e.g., software and/or programs) to allow users to perform a variety of different tasks or functions. For example, an application may be a word processing application used to generate documents or a media viewing application to view digital content/media. In another example, an application may present a graphic user interface (GUI) to enable a user to interact with the application.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Implementations of the disclosure describe searching and routing geographically-positioned entities. In one embodiment, an application executing on a computing device (e.g., a computer, a smartphone, a tablet, etc.) provides a graphical user interface (GUI) that interfaces with a server device that searches and routes geographically-positioned entities. The geographically-positioned entities may include transportation entities (e.g., a taxi, a shuttle, a limousine, etc.). Prior to initiating the process to request one of the geographically-positioned entities, a user can view a demonstration of an online transportation ordering process. The demonstration visually illustrates to the user how to use the application to order a transportation entity. The demonstration can be provided via a demo GUI.

In one embodiment, the demo GUI presents a map and icons that represent the location of a user and the location of a transportation entity. A simulated movement of a transportation entity toward the location of a user may be displayed on the GUI. The GUI may also present multiple GUI elements (e.g., a text box, a counter, etc.) to indicate the distance between the transportation entity and the user, and/or to indicate a time of arrival for the transportation entity.

Mechanisms for facilitating a transportation ordering process are also described. In one embodiment, an application executing on a computing device may determine the location of the computing device. The location may be transmitted to a server and the application may receive the locations of one or more transportation entities in the vicinity of the computing device from the server. The application may display a GUI including a map and may display icons indicating the location of the computing device and the locations of the one or more transportation entities. The application may receive additional data indicating updated locations of the one or more transportation entities and may update the locations of the icons. The application may also receive user input selecting an icon and may transmit a request for transportation to the server.

Embodiments of the disclosure provide a more realistic and/or interactive demonstration regarding the use and/or functions of a transportation ordering application. The actual location of the user may be used as part of the demonstration which may allow a user to better understand and better visualize how to use the application and the functions of the application. Embodiments of the disclosure also provide for an easy, fast, and intuitive mechanism for a user to view available transportation vehicles in the user's vicinity and to order transportation.

Figure 1:
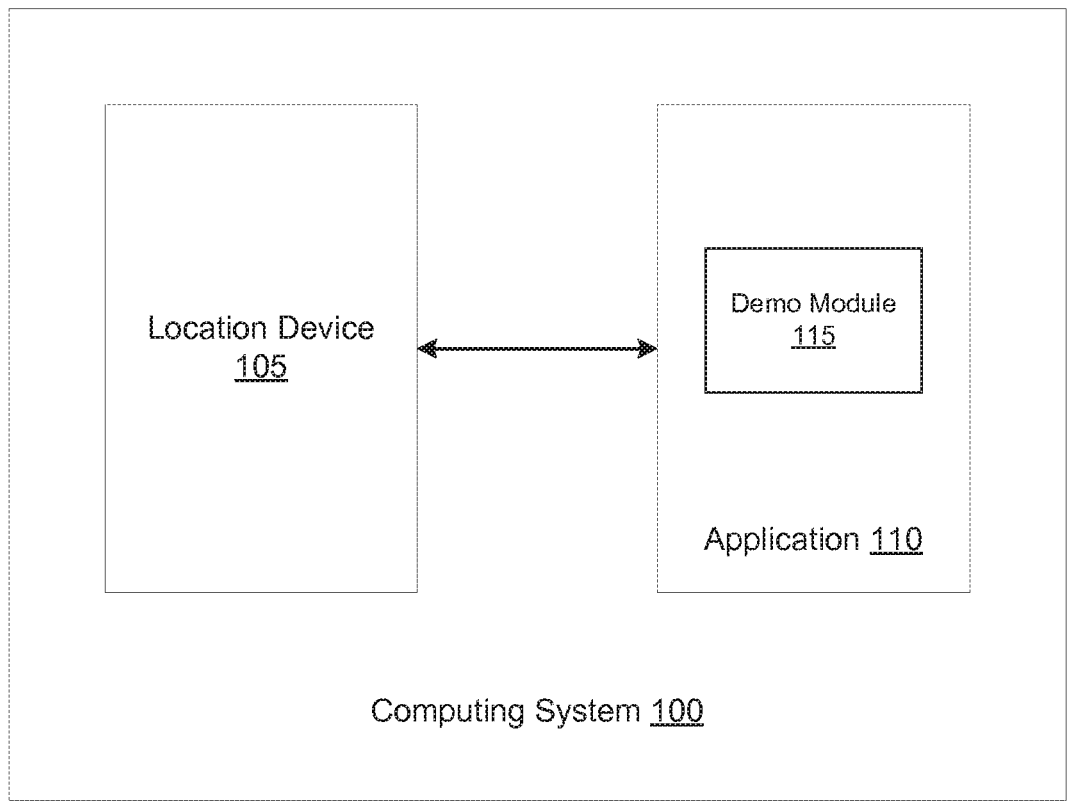
FIG. 1 is a block diagram of an example computing system in which embodiments of the disclosure may operate.

FIG. 1 is a block diagram of an example computing system in which embodiments of the disclosure may operate. The computing system 100 may include computing devices that have a wide range of processing capabilities such as a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. The computing system may include a location device 105 and an application 110.

The location device 105 may be software and/or hardware which are capable of obtaining the location of the computing system 100. For example, the location device 105 may be a Global Positioning System (GPS) device and/or the software for the GPS device. The location device 105 may include, but is not limited to, a GPS device, an Assisted GPS (A-GPS) device, a Global Navigation Satellite System (GLONASS) device, a device capable of communicating with cellular communication towers to obtain location information for the cellular communication towers, and/or any device capable of obtaining the location of the computing system 100, and/or software associated with such devices.

The application 110 may be computer software and/or a program (e.g., instructions) executing on the computing system. In one embodiment, the application 110 is an application which allows a user of the computing system 100 to order or request a transportation entity (e.g., a taxi, a shuttle, etc.). The user may use the application 110 to request/order a transportation entity to a particular location (e.g., order a taxi to the location of the user). The application 110 may include a GUI to facilitate user input and present data to a user.

In one embodiment, the application 110 may allow a user to order/request a transportation entity via a network (e.g., order a transportation entity online). A transportation entity may include, but is not limited to, a car, a taxi, a shuttle, a bus, a limousine, a car, a motorcycle, a scooter, a train, an airplane, or any other vehicle or machine capable of transporting a user from one geographic location to another geographic location. The application 110 may use a network communication device (e.g., a network interface card, a wireless network card, a cellular communication card, etc.), not shown in FIG. 1, to communicate with a server (not shown) and to allow a user to order a transportation entity using the server.

During an actual transportation entity ordering process, the application 110 may provide a GUI including a map to the user. When user input indicating an order/request for a transportation vehicle is received, the application 110 may send the geographic location of the user to the server, and present a GUI displaying the geographic location of the user on the map. The server may identify an appropriate transportation entity and send a message to the transportation entity to instruct the transportation entity to go to the geographic location of the user. As the transportation entity moves towards the user, the GUI may display an icon representing the transportation entity and may show the movement of the transportation entity towards the location of the user. In one embodiment, during an actual transportation entity ordering process, the application 110 may communicate with the server to obtain the location of the transportation entity (e.g., to obtain the transportation entity's current location). Each transportation entity updates the server with its location at periodic time intervals (e.g., every thirty seconds, every minute, etc.). The server may provide this information to the application 110 and the application 110 may show the movement of the transportation entity (e.g., show the changes in location) using the information obtained from the server.

In one embodiment, the application 110 may communicate with the location device 105 to obtain location information. For example, the application 110 may obtain the geographic location (e.g., GPS coordinates, longitude/latitude, street address location, etc.) of the computing system 100 using the location device 105. The location information may include the location of the computing system 100 or user. For example, the location information may include a street address (e.g., 550 A Street) and/or the GPS coordinates where the computing system 100 (e.g., a smartphone used by a user) is located. The application 110 may use the GPS coordinates to order a transportation entity to the street address of the user/computing system 100.

A user may be unfamiliar with the application 110 (e.g., may not know how to use the application 110 or may not know the functions of the application 110) and may be unfamiliar how to use the GUI of the application 110. The application 110 may include a demo (demonstration) module 115 to present a demonstration of how to use the application 110 and/or of the functions of the application. In one embodiment, the demo module 115 demonstrates a process for ordering a transportation entity to a destination. For example, the demo module 115 may demonstrate a process for ordering a taxi to a current geographic location (e.g., GPS location or a street address location) of a user.

Figure 2A:
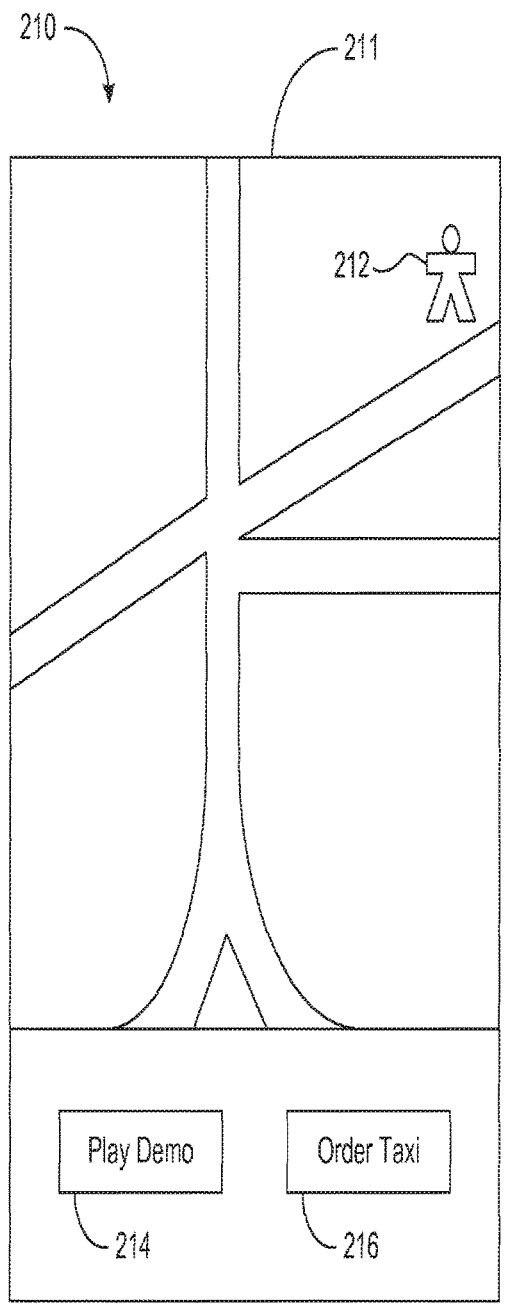
FIG. 2A is an example graphical user interface (GUI) in accordance with one embodiment of the present disclosure.

FIG. 2A is an example GUI 210 in accordance with one embodiment of the present disclosure. The GUI 201 includes a map portion 211, a user icon 212, a "Play Demo" button 214, and an "Order Taxi" button 216. As discussed above, the GUI 210 may be a GUI for an application for ordering a transportation entity. The GUI 210 may be presented to the user on a screen (e.g., a display or touch screen) of a computing device (e.g., a PDA, smartphone, tablet, etc.) The GUI 210 may be provided to facilitate the ordering of the transportation entity to the location of the user/computing device.

The map portion 211 displays a map of a geographic area (e.g., displays streets, intersections, roads, etc.). The map portion 211 may also display buildings and/or other landmarks (e.g., a park, a lake, a parking lot, a mall, an airport, etc.) in the geographic area. The user icon 212 may represent the geographic location of the user of the computing device. For example, the user may be standing on the sidewalk along a street and the user's geographical location may be indicated in the map displayed within the map portion 211 using the user icon 212. It should be understood that the geographic location of the user (represented by the user icon 212) may not be completely accurate. For example, due to the capabilities of a GPS device, the geographic location of a user may be accurate to within a few meters.

In one embodiment, the map portion 211 displays a map of a geographic area in the vicinity of a user. For example, the map portion 211 may display a map of an area within a two block radius of the user. In one embodiment, the GUI 210 may allow a user to zoom in and/or zoom out in the map portion 211. When a user zooms in (e.g., increases the amount of details/information presented in the map), the user may be able to view a more detailed view of a smaller geographic area. When a user zooms out (e.g., decrease the amount of details/information presented in the map), the user may be able to view a less detailed view of a larger geographic area.

The "Order Taxi" button 216 may allow a user to place an actual order/request for a transportation entity. Based on the location of the user (represented by the user icon 212) the application may send data to a server (now shown in the figures) to request a transportation entity (e.g., a taxi, a shuttle, etc.) to pick up the user at the user current location (e.g., at the location indicated by user icon 212).

The "Play Demo" button 214 may allow a user to initiate a demonstration of a transportation ordering process to become familiar with the process. The demonstration may use the current location of the user to present a more realistic and more interactive demonstration, as discussed in more detail below in conjunction with FIGS. 2B-2D.

Figure 2B:
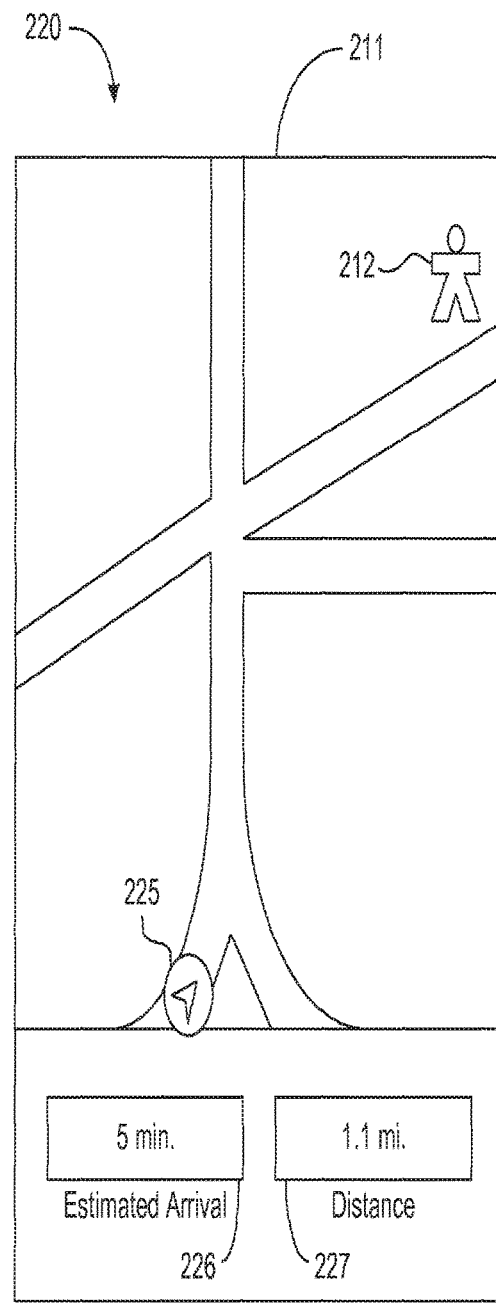
FIG. 2B is an example graphical user interface (GUI) in accordance with another embodiment of the present disclosure.

FIG. 2B is an example GUI 220 in accordance with another embodiment of the present disclosure. The GUI 220 includes the map portion 211, the user icon 212, a transportation entity icon 225, a GUI element 226 and a GUI element 227. The GUI 220 may be presented to a user to present a demonstration of a transportation ordering process. For example, the GUI 220 may be presented to a user after the use selects the "Play Demo" button 214 shown in FIG. 2A. In one embodiment, the GUI 220 may be presented by an application (e.g., application 110) and/or a demonstration module (e.g., demo module 115).

The GUI 220 may be presented as part of a demonstration of a transportation ordering process. The geographic location of the user may be obtained and displayed in the GUI 220 at the beginning of the demonstration. The geographical location of the user is represented in the map portion 211 by the user icon 212. The application may display a transportation entity on the GUI 221, represented in the map portion 211 by the transportation entity icon 225. In one embodiment, the transportation entity icon 225 may not represent an actual transportation entity (e.g., may not be an actual taxi or shuttle) but rather represent an abstract transportation entity. The transportation entity icon 225 may be displayed to demonstrate how the location of a real transportation entity would be displayed to the user on the map portion 211.

The GUI element 226 (labeled "Estimated Arrival") may display an estimated time of arrival of the transportation entity (represented by transportation entity icon 225) to the user's location (represented by user icon 212). In one embodiment, the GUI element 226 may display a time (e.g., 5:05 PM) at which the transportation entity may arrive at the user's location. In another embodiment, the GUI element 226 may display a duration (e.g., 5 minutes) of time for the transportation entity to arrive at the user's location. The GUI element 227 (labeled "Distance") may display the distance (e.g., 1.1 mi.) between the user and the simulated transportation vehicle.

Figure 2C:
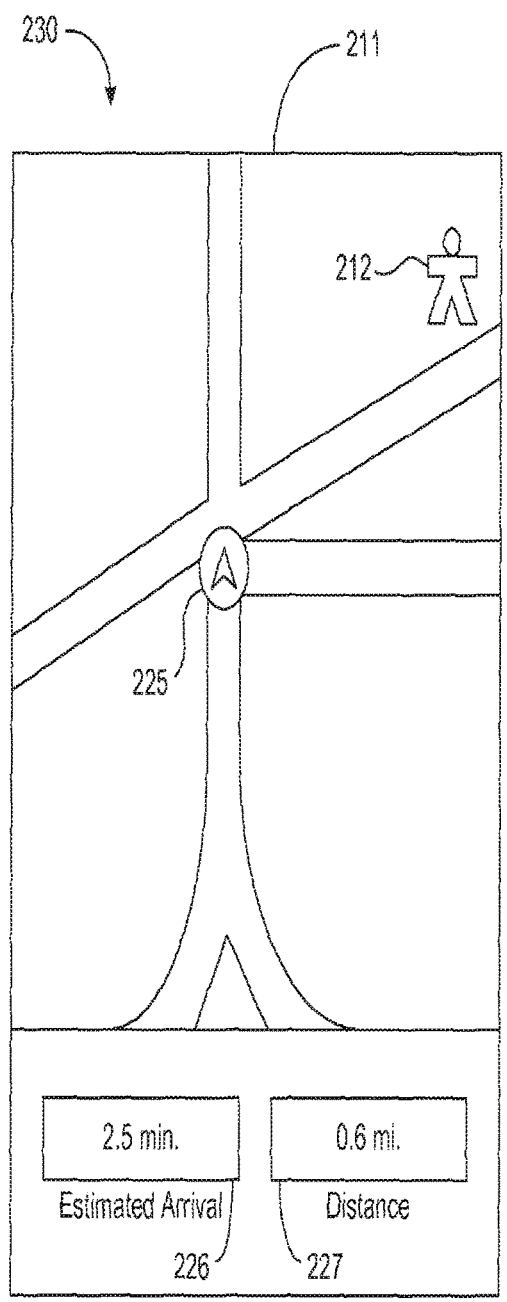
FIG. 2C is an example graphical user interface (GUI) in accordance with a further embodiment of the present disclosure.

FIG. 2C is an example GUI 230 in accordance with a further embodiment of the present disclosure. The GUI 230 includes the map portion 211, the user icon 212, the transportation entity icon 225, the GUI element 226 (labeled "Estimated Arrival") and the GUI element 227 (labeled "Distance"). The GUI 230 may be presented to the user during a demonstration of a transportation ordering process. The GUI 230 may be presented to the user after the GUI 220 is presented to the user.

As shown in the GUI 230, the transportation entity (represented by transportation entity icon 225) is moving closer to the user. In one embodiment, this movement is a simulated movement of a transportation entity (e.g., an abstract transportation entity) represented by the icon 225. As the transportation entity moves towards the user, the GUI element 226 displays an updated time before the transportation entity will arrive at the user's location (e.g., 2.5 minutes). In addition, the GUI element 227 displays an updated distance (e.g., 0.6 miles) between the transportation entity and the user.

Figure 2D:
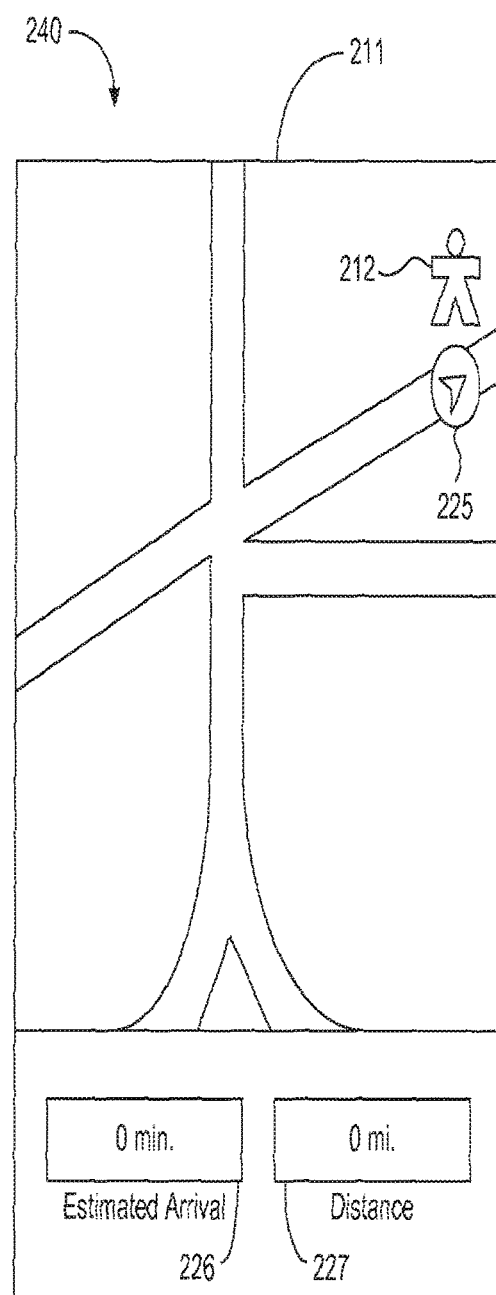
FIG. 2D is an example graphical user interface (GUI) in accordance with yet another embodiment of the present disclosure.

FIG. 2D is an example GUI 240 in accordance with yet another embodiment of the present disclosure. The GUI 240 includes the map portion 211, the user icon 212, the transportation entity icon 225, the GUI element 226 (labeled "Estimated Arrival") and the GUI element 227 (labeled "Distance"). The GUI 240 may be presented to the user during a demonstration of a transportation ordering process. The GUI 240 may be presented to the user after the GUI 230 is presented to the user.

As shown in the GUI 240, the transportation entity (represented by transportation entity icon 225) has arrived at the user's location. As discussed above, the movement of the transportation entity is a simulated movement. The GUI element 226 displays an estimated time of "0 min" because the transportation entity has arrived at the user's location. In addition, the GUI element 227 displays a distance of 0 miles because the transportation entity has arrived at the user's location.

Referring to FIGS. 2A-2D, the demonstration presented by the GUIs 210, 220, 230, and 240 provides a more realistic and/or more interactive demonstration of a transportation ordering process provided by an application. By using the user's location (accurate to within a certain distance) and by displaying a transportation entity on a map within the map portion of the GUI 220, the user may better understand how the transportation ordering process works. For example, the user may be able to better understand that during a transportation ordering process, the location of the user will be displayed on a map. When the user orders a transportation entity, the location of the actual transportation entity will also be displayed on the map and the movement of the actual transportation entity towards the user will also be displayed on the map.

Figure 3:
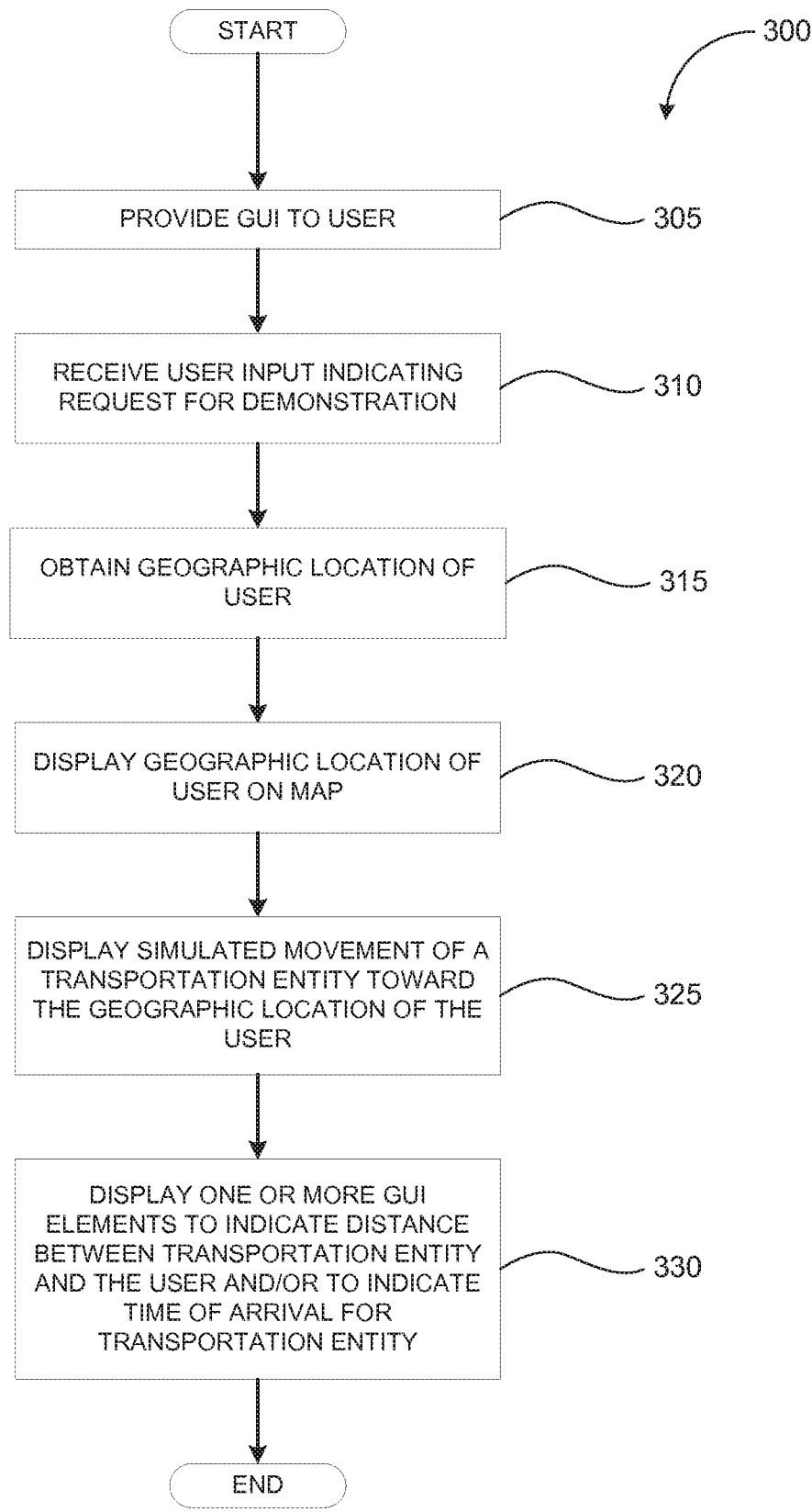
FIG. 3 is a flow diagram illustrating a method for demonstrating a transportation ordering process, in accordance with one embodiment of the present disclosure.

FIG. 3 is a flow diagram illustrating a method 300 for demonstrating a transportation ordering process, in accordance with one embodiment. For simplicity of explanation, the method is depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods disclosed here could alternatively be represented as a series of interrelated states via a state diagram or events. The method 300 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 300 is performed by a computing system (e.g., the computing system 100 of FIG. 1).

Referring to FIG. 3, the method 300 begins at block 305 where the computing system provides a GUI (e.g., GUI 210) to a user. As discussed above, the computing system (e.g., an application executing on the computing system) may be used by the user to request/order a transportation entity (e.g., a taxi) to a certain location (e.g., to the user's location). At block 310, the computing system receives user input indicating a request for a demonstration of the application, via the GUI (e.g., receives user selection of button 214). The computing system starts the demonstration by obtaining the geographic location (e.g., GPS coordinates, street address location, etc.) of the user (block 315). At block 320, the demonstration continues where the computing system displays the geographic location of the user on a map (e.g., on the map portion 211 shown FIGS. 2A-2D). The computing system displays a simulated movement of a transportation entity toward the geographic location of the user at block 325 (as shown by the transportation entity icon 225 in FIGS. 2B-2D). In particular, a transportation entity is placed on the map at a certain location and the movement is simulated. Optionally, at block 330, the computing system may also display one or more GUI elements (e.g., counters) to indicate the distance between the transportation entity and the user, and/or to indicate a time of arrival for the transportation entity (as shown by GUI elements 226 and 227 shown in FIGS. 2B-2D).

Figure 4:
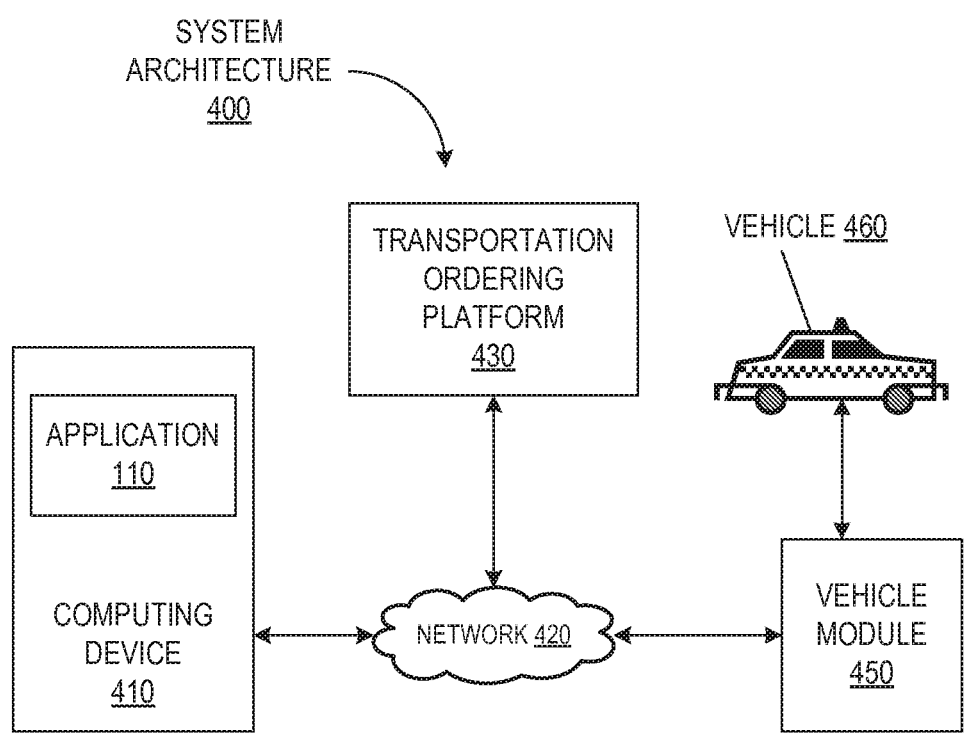
FIG. 4 is a block diagram illustrating an example system architecture, in accordance with one embodiment of the present disclosure.

FIG. 4 illustrates an example system architecture 400, in accordance with one embodiment of the present disclosure. The system architecture 400 includes a computing device 410, a network 420, a transportation ordering platform 430, a vehicle 460, and a vehicle module 450. In one embodiment, network 420 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one embodiment, the transportation ordering platform 430 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that manage, monitor, and communicate with transportation vehicles to allocate and route transportation vehicles to different locations. For example, the transportation ordering platform 430 may receive requests from users to order transportation vehicles to certain locations (e.g., the airport, the mall, etc.). The transportation ordering platform 430 may identify various transportation vehicles and their locations (e.g., by communicating with the vehicle module 450 in a vehicle 460) and may provide the locations of the various transportation vehicles to the user. The user may select one of the transportation vehicles and the transportation ordering platform 430 may instruct a transportation vehicle to go to the user's location.

The transportation vehicle 460 may be any vehicle such as a taxi, a car, a truck, a van, a limousine, a sport utility vehicle, etc., that may be used to transport users to different locations. The transportation vehicle 460 may be coupled to a vehicle module 450. The vehicle module 450 may be a computing device (e.g., a smartphone, a tablet computer, a laptop computer, etc.). The vehicle module 450 may communicate (e.g., wirelessly via cellular communication) with the transportation ordering platform 430 to receive orders for transportation vehicles and location information. For example, the vehicle module 450 may receive a request to pick up a user at a particular location. The vehicle module 450 may be installed in the transportation vehicle 460.

The computing device 410 may be a computing device such as a personal computer (PC), a laptop computer, a mobile phone, a smart phone, a cellular phone, a personal digital assistant (PDA), a tablet computer, a netbook computer, etc. In one embodiment, the computing device 410 may also be a smartwatch device. Smartwatch device may be a computing device that is wearable on a wrist or arm of the user. The smartwatch may be coupled to another computing device (e.g., a smartphone) via a wired or wireless connection (e.g., via BlueTooth, via 802.41 protocols), etc.

In one embodiment, the computing device 410 may include an application 110 (as illustrated in FIG. 1). The application 110 may be an app, an application, a program, a software module/component, etc., that may be used to request or order transportation vehicles (e.g., a taxi, a car, etc.). The application 110 may also allow a user to pay for a ride or a trip, monitor the locations of different transportation vehicles, select a transportation vehicle, provide feedback on drivers and/or transportation vehicles (e.g., rate a driver), etc. The application 110 also provides a variety of information to the user such as estimated time of arrival (ETA) of the transportation vehicle, information about the driver of the transportation vehicle (such as driver name/phone number), information about the transportation vehicle (e.g., type of vehicle, make, model, year, etc.), updates about whether a driver will late, or has arrived and is waiting, and whether a ride has been completed (e.g., whether the transportation vehicle has arrived at the destination specified by the user).

In one embodiment, the user may provide user input to the application 110 to order and/or request a transportation vehicle (e.g., to order a taxi or a cab). For example, the user may select a button or menu option to indicate that the user wants to order and/or request a transportation vehicle. When user input indicating an order/request for a transportation vehicle is received, the application 110 may obtain the geographic location of the computing device 410 and may send the geographic location of the computing device to the server.

Each transportation entity may update the server with its location at periodic time intervals (e.g., every thirty seconds, every minute, etc.). The server may provide this information to the application 110 and the application 110 may show the movement of the transportation entity (e.g., show the changes in location) using the information obtained from the server. In one embodiment, the application 110 may communicate with a location device (E.g., location device 105 illustrated in FIG. 1) such as a GPS device to obtain the location of the computing device 410 (e.g., to obtain GPS coordinates, longitude/latitude, street address location, etc.). The application 110 may provide the location of the computing device 410 to the transportation ordering platform 430.

Figure 5A:
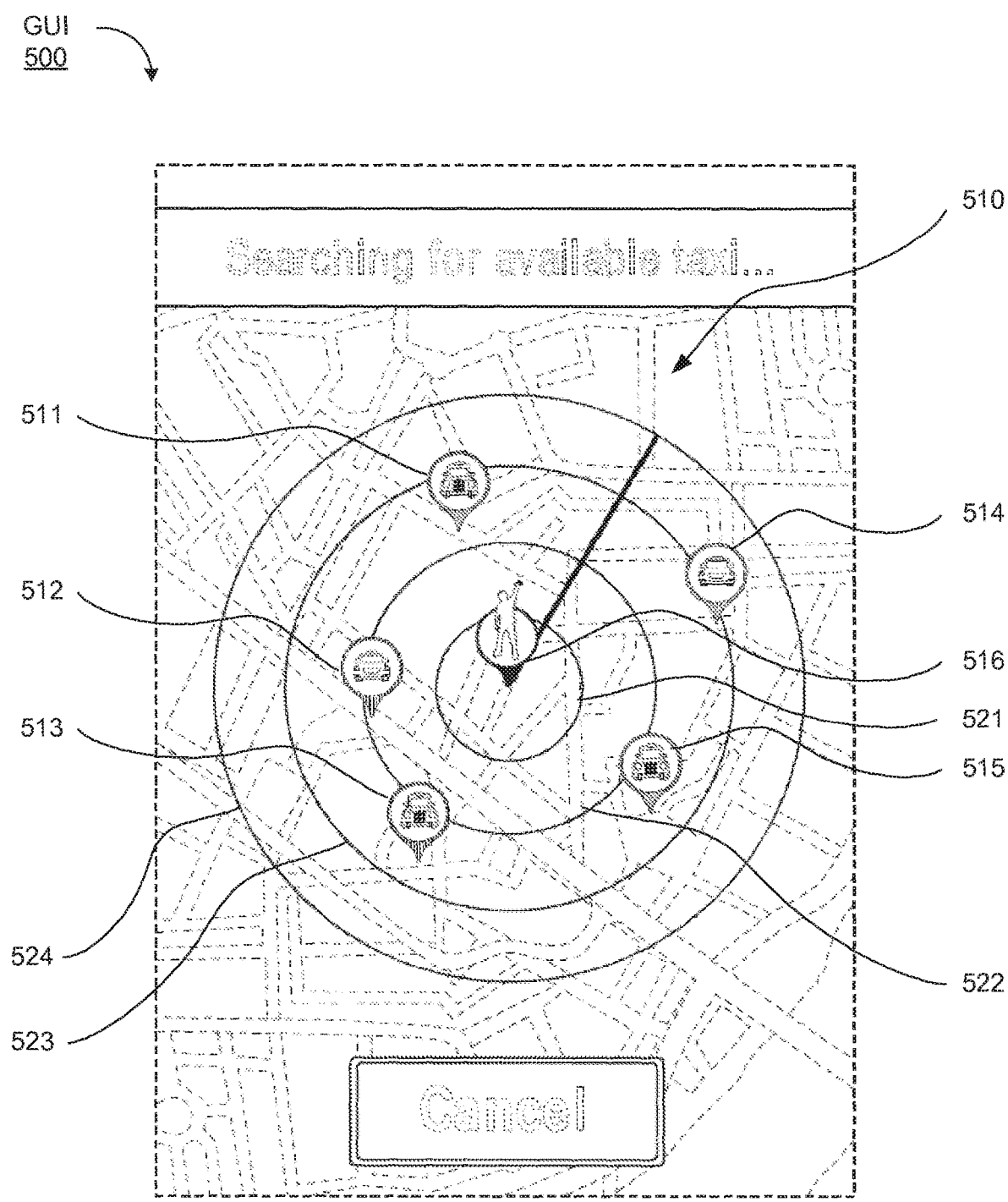
FIG. 5A is an example GUI in accordance with one embodiment of the present disclosure.

The application 110 may also provide a GUI including a map to the user (as illustrated in FIG. 5A). The map may display the geographic location of the computing device 410 on the map. The map may also display the geographic location of one or more transportation vehicles. As discussed above, the application 110 may provide information indicating the geographical location of the computing device 410 to the transportation ordering platform 430. Each transportation entity (e.g., one or more vehicles such as vehicle 460) may periodically update the transportation ordering platform 430 with its location (as discussed above in conjunction with FIG. 1). Based on the location of the computing device 410 and the locations of the transportation entities that are periodically updating the transportation ordering platform 430 with their location, the transportation ordering platform 430 may identify one or more transportation entities that are in the vicinity of the location of the computing device 410 (e.g., within a half mile radius, within a one mile radius, within a five mile radius, etc.). The transportation ordering platform 430 may provide the geographical locations of the one or more transportation entities to the application 110 and the application 110 may present the location of the one or more transportation entities on the map in the GUI (using icons or GUI elements as illustrated in FIG. 5A).

In one embodiment, the user may select one of the transportation entities using the GUI to request and/or order the selected transportation entity to pick up the user at the location of the computing device 410 (e.g., at the location of the user). For example, the user may select the icon associated with one or more of the transportation entities using the GUI. The transportation ordering platform 430 may identify the selected transportation entity (e.g., vehicle 460) and may send a message to the vehicle module 450. The message may indicate the location of the computing device 410 and the driver of the vehicle 460 may proceed to the location of the computing device 410. In another embodiment, the transportation ordering platform 430 may identify an appropriate transportation entity (e.g., vehicle 460) and may send a message to the transportation entity to instruct the transportation entity to go to the geographic location of the user. For example, the transportation ordering platform 430 may identify the closest transportation entity to the user or may identify a transportation entity based on the users' preferences (e.g., based on a preferred driver, preferred make/model, etc.).

After a transportation entity has been selected by the user and/or has been identified by the transportation ordering platform 430, the transportation entity may be instructed to pick up the user ad the location of the computing device. For example, the transportation ordering platform 430 may send a message to the vehicle module 450 in the vehicle 460 to instruct the driver of the vehicle 460 to pick up the user at a location. The driver may begin to move (e.g., drive and/or steer) the vehicle 460 towards the location of the user. As the vehicle 460 moves towards the user, the GUI may display an icon representing the vehicle 460 and may show the movement of the vehicle 460 towards the location of the user (as discussed above).

FIG. 5A is an example GUI 500 in accordance with one embodiment embodiment of the present disclosure. The GUI 500 includes a map 510, GUI elements 511, 512, 513, 514, 515, 516, and circles 521, 522, 523, and 524. As discussed above, an application (e.g., a transportation application) may provide the location of a computing device to a transportation ordering platform. The transportation ordering platform may receive periodic updates of the locations of one or more transportation entities (e.g., one or more vehicles, taxis, cars, etc.). Based on the location of the computing device and the locations of the transportation entities that are periodically updating the transportation ordering platform with their location, the transportation ordering platform may identify one or more transportation entities that are in the vicinity of the location of the computing device (e.g., within a half mile radius, within a one mile radius, within a five mile radius, etc.). The transportation ordering platform may provide the geographical locations of the one or more transportation entities to the application.

As illustrated in FIG. 5A, the GUI 500 presents a map 510 that may display the area or vicinity around the location of the computing device. The location of the computing device (e.g., of the user) may be displayed in the GUI 500 using GUI element 516 (e.g., using an icon, an image, etc.). The GUI element 516 may be in the center of the circles 521 through 524. The application may also display the location of the one or more transportation entities on the map 510 in the GUI 500 using GUI elements 511 through 515 (e.g., using icons representing the one or more transportation entities). Each GUI element 511, 512, 513, 514, and 515 may represent the location of a transportation entity (e.g., a vehicle, such as a car, a taxi, a cab, a limousine, etc.). In one embodiment, as the transportation entities change their location (e.g., as the transportation entities drive and/or move around) the GUI elements 511 through 515 may change position on the map 510 to reflect the changed locations of the transportation entities (e.g., to indicate the updated locations of the transportation entities). For example, as the transportation entity represented by GUI element 511 moves north (e.g., up and away from the location of the computing device represented by GUI element 516), the GUI element 511 may also be moved north to represent the movement of the transportation entity represented by the GUI element 511.

The circles 521, 522, 523, and 524 may indicate distances or ranges starting from the location of the computing, represented by the GUI element 516. For example, circle 521 may encompass a geographical area that is within 0.1 miles of the computing device, circle 522 may encompass a geographical area that is within 0.2 miles of the computing device, circle 523 may encompass a geographical area that is within 0.3 miles of the computing device, and circle 524 may encompass a geographical area that is within 0.4 miles of the computing device. The circles 521, 522, 523, and 524 may also be referred to as range indicators and/or distance indicators. A range indicator and/or a distance indicator may be any image, icon, shape, design, GUI element, etc., that may indicate a distance on the map 510. The circles 521, 522, 523, and 524 are concentric circles. For example, circle 524 encompasses circles 521 through 523, circle 523 encompasses circles 521 and 522, and circle 522 encompasses circle 521. The circles 521, 522, 523, and 524 (e.g., the range indicators and/or the distance indicators) may allow a user to more quickly and/or more easily identify which of the multiple transportation entities is closer to the computing device (e.g., is closer to the user). For example, the user may identify the transportation entity associated with GUI element 512 as the closest transportation entity to the location of the computing device. Although circles are illustrated in FIG. 5A, in other embodiments, various other shapes may be used to indicate ranges and/or distances from the computing device.

In one embodiment, the user may select one of the GUI elements 511 through 515. Selecting one of the GUI elements 511 through 515 may indicate that the user wants to request and/or order transportation (e.g., order a ride) using the transportation entity associated with the selected GUI element. For example, the user may select GUI element 512. The application may transmit and/or send a message to the transportation ordering platform indicating that the user is ordering transportation from the transportation entity associated with GUI element 512. The transportation entity may transmit a message to the driver of the transportation entity associated with GUI element 512 (e.g., may transmit a message to a vehicle module) indicating the location of the computing device and/or instructing the driver of the transportation entity to pick up the user at the location of the computing device. As the transportation entity moves (e.g., drives) towards the location of the computing device, the GUI element 512 may change positions to indicate the movement of the transportation entity associated with the GUI element 512 (e.g., to indicate the updated locations of the transportation entity associated with the GUI element 512).

Figure 5B:
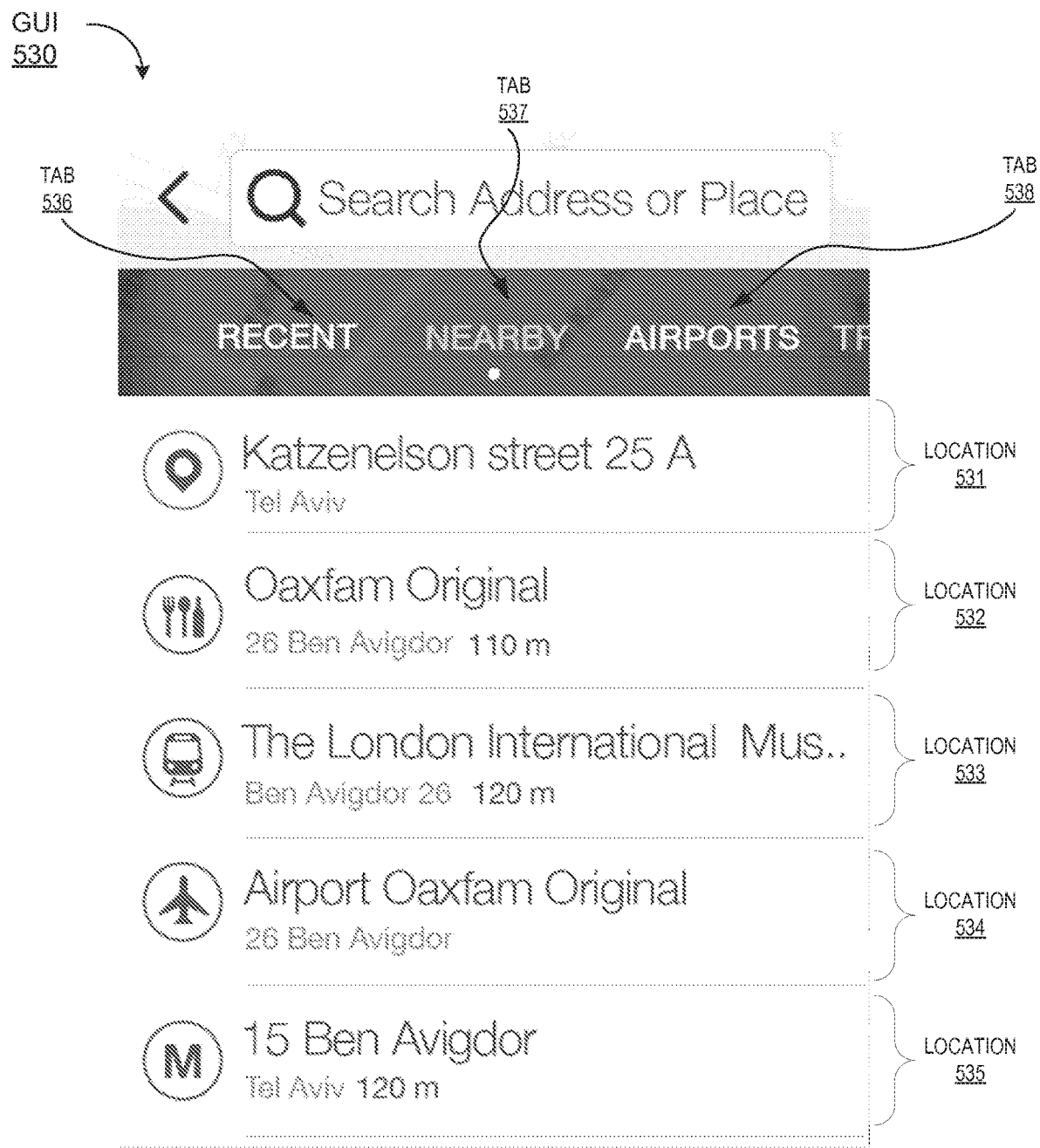
FIG. 5B is a diagram illustrating a GUI 530, in accordance with another embodiment of the present disclosure.

FIG. 5B is a diagram illustrating a GUI 530, in accordance with another embodiment of the present disclosure. The GUI 530 may be presented and/or displayed by an application (e.g., application 110 illustrated in FIG. 1). The GUI 530 includes locations 531 through 535 and tabs 536 through 538. As discussed above, the application (e.g., a transportation application) may provide the location of a computing device to a transportation ordering platform during a transportation ordering process (e.g., during a process to order a transportation entity to a location to pick up a user). The GUI 530 may allow the user to input and/or specify a location where the transportation entity should pick up the user.

The tabs 536, 537, and 538 may allow the user to choose different categories of locations. For example, tab 536 may allow the user to select locations that the user has recently specified and/or inputted, tab 537 may allow the user to select locations that are nearby or in the vicinity of the user's current location, and tab 538 may allow the user to select locations that are in airports or that are in the vicinity of airports. As illustrated in FIG. 5B, the tab 537 is selected. Locations 531 through 535 are displayed in the GUI 530 to indicate locations that are near or in the vicinity of the user. The locations 531 through 535 may be locations that the user has previously selected and/or locations that other users of the transportation ordering platform have previously selected. The user may select one of the locations 531 through 535 to order a transportation entity to the selected location (as illustrated in FIG. 5C).

Figure 5C:
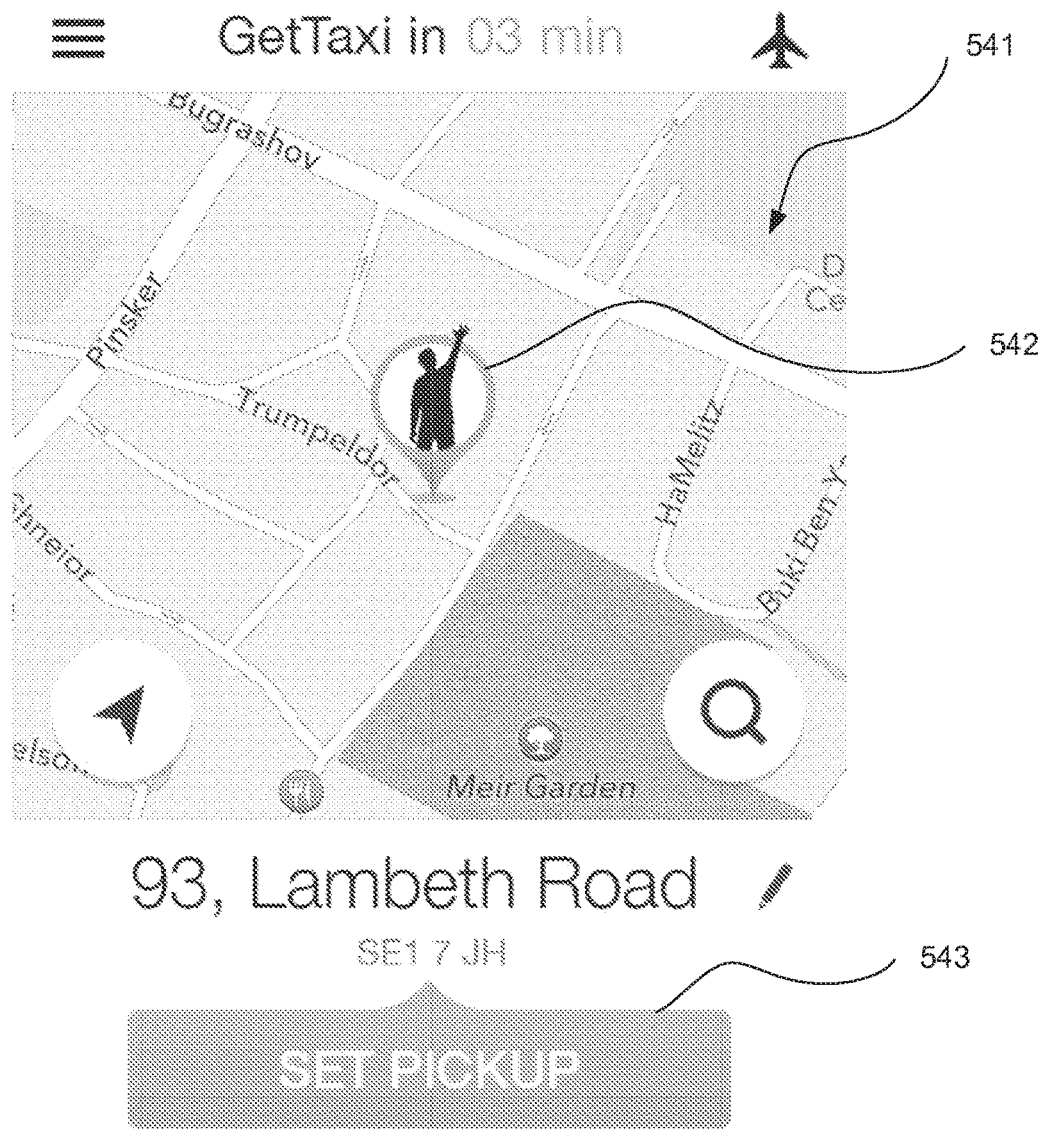
FIG. 5C is a diagram illustrating a GUI, in accordance with a further embodiment of the present disclosure.

FIG. 5C is a diagram illustrating a GUI 540, in accordance with a further embodiment of the present disclosure. The GUI 540 may be presented and/or displayed by an application (e.g., application 110 illustrated in FIG. 1). The GUI 540 includes a map 541, a GUI element 542, and a button 543. As illustrated in FIG. 5C, the map 541 indicates the location of the computing device (e.g., the location of the user) using GUI element 542 (e.g., an icon). The GUI 540 also includes text that may indicate a street address of the location of the computing device (e.g., 93, Lambeth Road). In one embodiment, the GUI 540 may be presented and/or displayed after the user selects a location (e.g., after the user selects location as illustrated in FIG. 5B). The GUI 540 also includes a button 543. The button 543 may allow the user to send a request for a transportation entity to pick up the user at the location indicated in the GUI 540. For example, after the user selects and/or activates the button 543, the application may transmit a message and/or other data to the transportation ordering platform indicating the location selected by the user and/or requesting a transportation entity to pick up the user at that location.

Figure 5D:
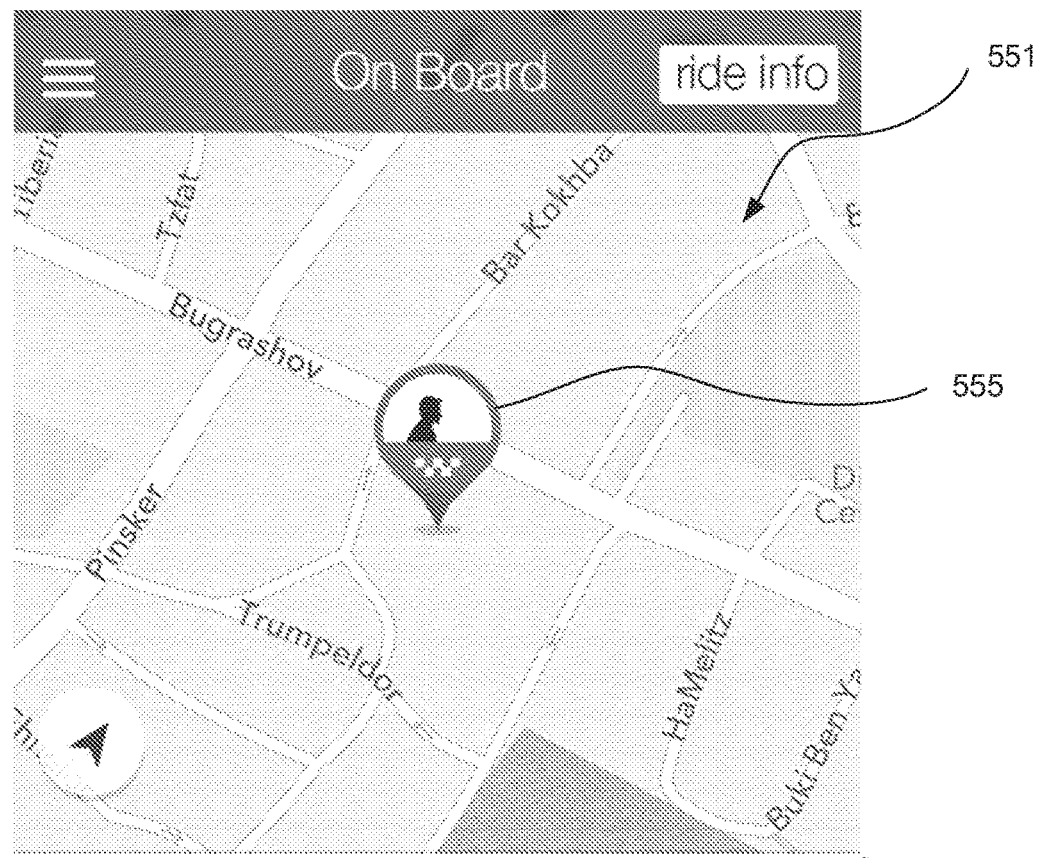
FIG. 5D is a diagram illustrating a GUI, in accordance with a further embodiment of the present disclosure.

FIG. 5D is a diagram illustrating a GUI 550, in accordance with a further embodiment of the present disclosure. The GUI 550 may be presented and/or displayed by an application (e.g., application 110 illustrated in FIG. 1). The GUI 540 includes a map 551, a GUI element 555, and a buttons 552 through 554. In one embodiment, the GUI 550 may be displayed to the user after the transportation entity has arrived at the location of the computing device to pick up the user. For example, the GUI 550 may be displayed and/or presented by the application after the user enters and/or boards a taxi cab that the user ordered and/or requested. As illustrated, the GUI 550 includes text (e.g., On Board) indicating that the user has boarded and/or entered the transportation entity. The map 551 may display a geographical area or location that includes the location of the transportation entity and the user/computing device. The GUI element 555 (e.g., an icon) may indicate the location of the transportation entity and the user/computing device on the map 551.

The buttons 552 through 554 may allow a user to perform additional actions using the application and/or the computing device. For example, button 552 may allow the user to connect and/or communicate with a wireless network (e.g., a Wi-Fi network) of the transportation entity. In another example, the button 553 may allow the user to provide a rating (e.g., indicate approval or disapproval, provide comments, etc.) of the driver of the transportation vehicle. In a further example, button 554 may allow the user to recommend the application (e.g., recommend the transportation application) to the user's friends, acquaintances, family, colleagues, and/or other people. The application may allow the user to provide a list and/or input the names, addresses, email address, other contact information, etc., of other people that the user may wish to invite to use the transportation application.

Figure 6:
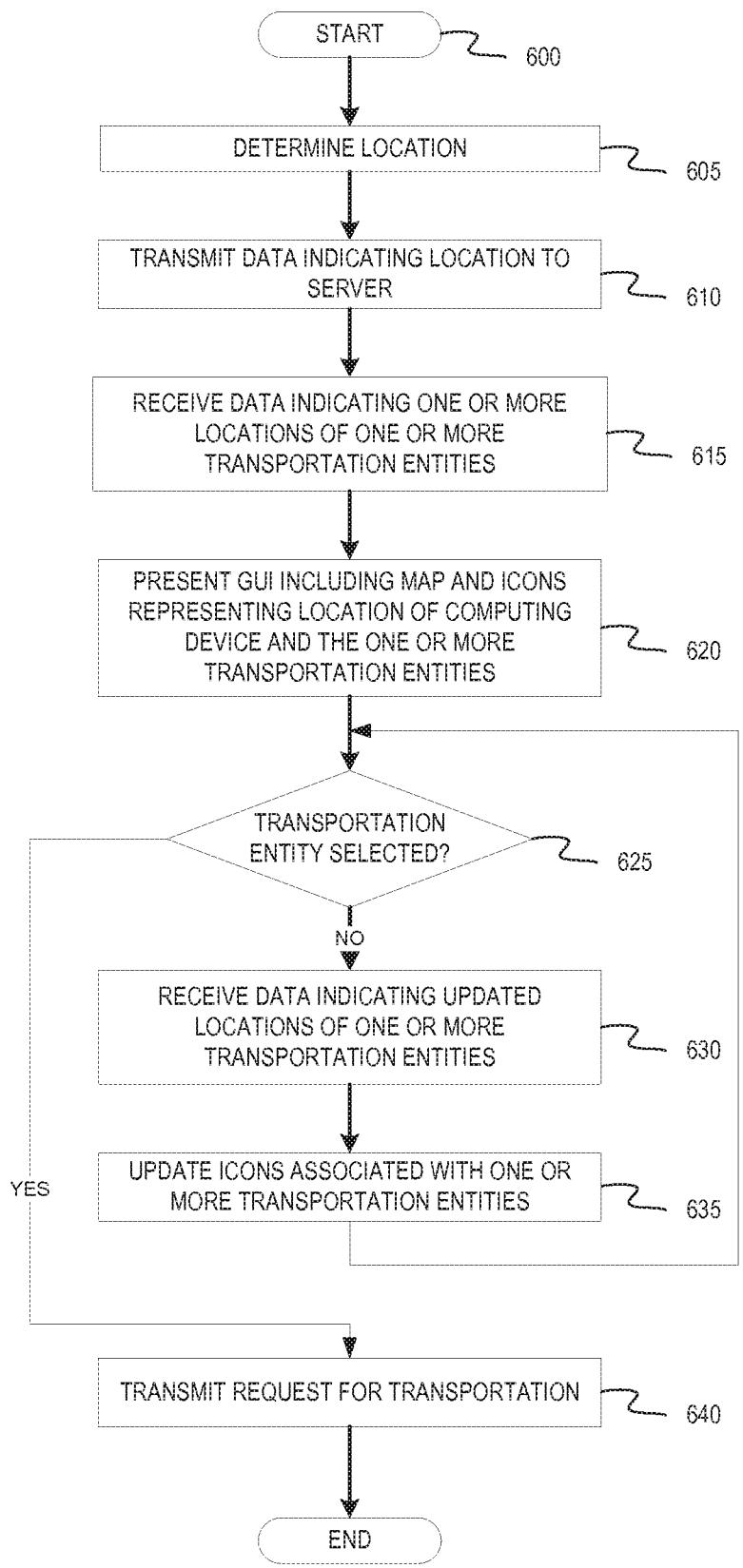
FIG. 6 is a flow diagram illustrating a method for displaying the locations of one or more transportation entities, in accordance with one embodiment of the present disclosure.

FIG. 6 is a flow diagram illustrating a method 600 for displaying the locations of one or more transportation entities, in accordance with one embodiment of the present disclosure. For simplicity of explanation, the method is depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods disclosed here could alternatively be represented as a series of interrelated states via a state diagram or events. The method 300 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 600 is performed by a computing system (e.g., the computing system 100 of FIG. 1).

Referring to FIG. 6, the method 600 begins at block 605 where the processing logic determines the location of the computing system or computing device (e.g., using a GPS device or module to obtain GPS coordinates or a street address). At block 610, the processing logic transmit data indicating the location of the computing system to a server (e.g., to a server of a transportation ordering platform). The processing logic receives data indicating one or more locations of one or more transportation entitles (e.g., vehicles) at block 615. The processing logic presents a GUI (e.g., as illustrated in FIG. 5A) and icons or GUI elements representing the location of the computing system and the one or more transportation entities (block 620).

At block 625, the processing logic determines whether the user has selected one or more of the transportation entities. For example, the processing logic may determine whether the user has selected one of the one or more of the icons associated with the one or more transportation entities. If the user has not selected a transportation entity, the processing logic proceeds to block 630, where the processing logic receives additional data indicating updated locations for the one or more transportation entities. The processing logic updates the icons for the one or more transportation entities at block 635. For example, the processing logic may move icons to different locations on the map within the GUI to represent the changed and/or updated positions of one or more transportation entities. After block 635, the processing logic proceed back to block 625. Referring back to block 625, if the user has selected a transportation entity, the processing logic proceeds to block 640, where the processing logic transmits a request for transportation to the server. For example, the processing logic may transmit a request and may indicate which of the icons was selected by the user. The server of the transportation platform may identify the transportation vehicle associated with the icon selected by the user and may transmit instructions to the driver of the transportation vehicle to pick up the user at the location of the computing device.

Figure 7:
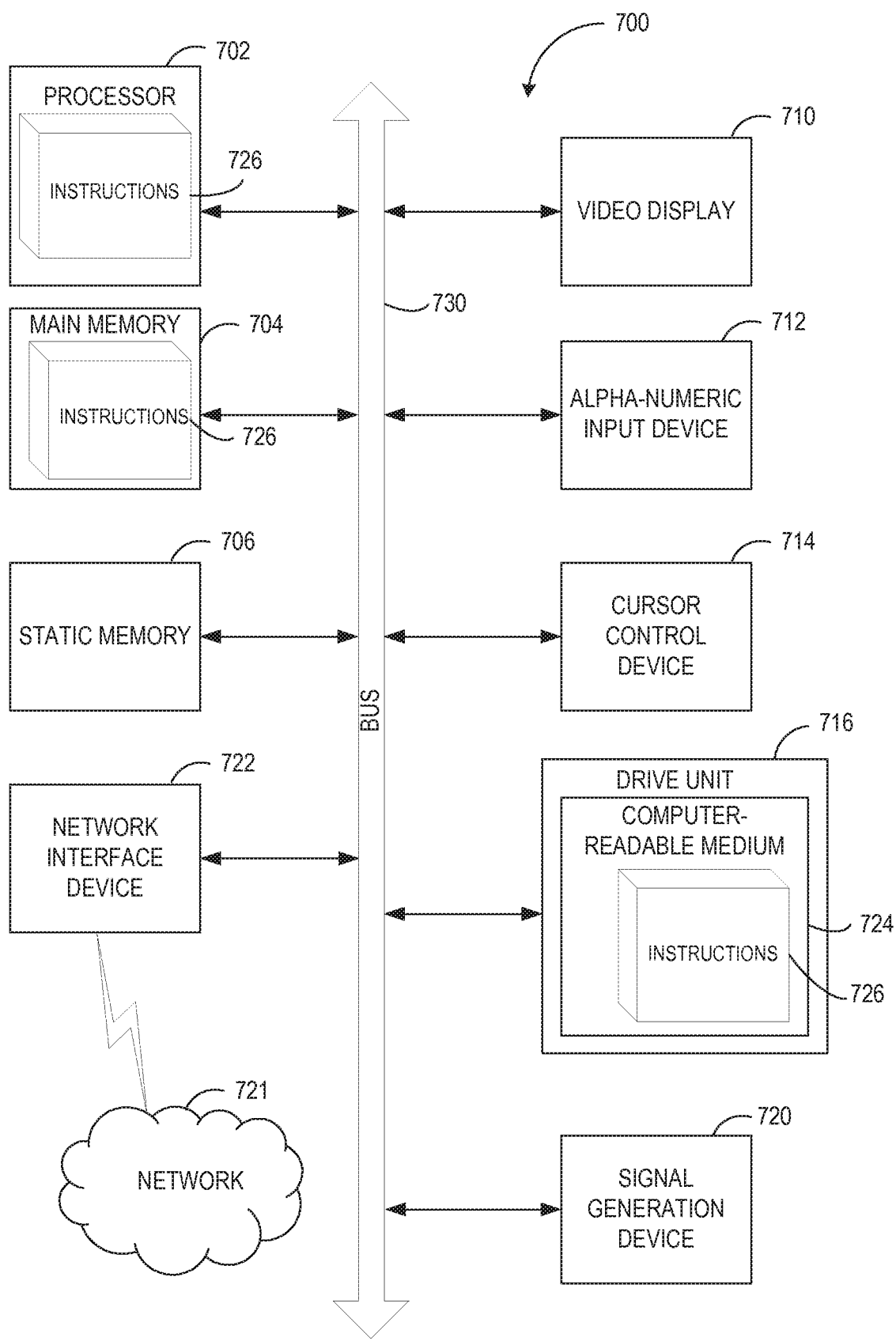
FIG. 7 illustrates a diagrammatic representation of a machine in the example form of a computer system, in accordance with one embodiment of the present disclosure.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 700 includes a processor 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory 716 (e.g., a data storage device), which communicate with each other via a bus 730.

The processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the instructions 726 (e.g., instructions for a demo module 115 and/or application 110) for performing the operations and steps discussed herein.

The computer system 700 may further include a network interface device 722. The network interface device may be in communication with a network 721. The computer system 700 also may include a video display unit 710 (e.g., a liquid crystal display (LCD), a touch screen, or a cathode ray tube (CRT)), an alphanumeric input device 712 (e.g., a keyboard or a touch screen), a cursor control device 714 (e.g., a mouse or a touch screen), and a signal generation device 720 (e.g., a speaker).

The secondary memory 716 may include a computer-readable storage medium (or more specifically a computer-readable storage medium) 724 on which is stored one or more sets of instructions 726 embodying any one or more of the methodologies or functions described herein (e.g., instructions for a demo module 115 and/or application 110). The instructions 726 may also reside, completely or at least partially, within the main memory 704 and/or within the processing device 702 during execution thereof by the computer system 700, the main memory 704 and the processing device 702 also constituting computer-readable storage media. The instructions 726 may further be transmitted or received over a network via the network interface device 722.

While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present disclosure. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "providing," "receiving," "obtaining," "displaying," "performing," "requesting," "determining," "transmitting," "presenting," updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
    establishing, by a network interface device of a client computing device, a communication session with a server computing device;
    transmitting, by a processing device of the client computing device via the communication session to the server computing device, a first packet comprising first data indicative of a geographic location of the client computing device;
    receiving, by the processing device via the communication session from the server computing device, a second packet comprising second data indicative of geographic locations of geographically-positioned entities;
    rendering, by the processing device via a display device of the client computing device, a graphical user interface (GUI) comprising a map of a geographical area inclusive of the geographic location of the client computing device;
    presenting, by the processing device via the GUI based on the first data, a first icon at a first coordinate on the map, wherein the first coordinate is representative of the geographic location of the client computing device;
    presenting, by the processing device via the GUI based on the second data, additional icons at other coordinates on the map, wherein the other coordinates are representative of the geographic locations of the geographically-positioned entities on the map;
    updating, by the processing device via the GUI, corresponding locations of the additional icons responsive to receiving an indication of updated locations of the geographically-positioned entities;
    receiving, by the processing device via the GUI, transportation ordering input comprising at least one of a demonstration request or a transportation request;
    responsive to the transportation ordering input comprising the demonstration request, presenting, by the processing device via the GUI, a simulation of a transportation entity, the simulation utilizing the geographic location of the client computing device; and
    responsive to the transportation ordering input comprising the transportation request, providing, by the processing device to the server computing device, the transportation request, wherein the server computing device is to transmit instructions to a driver device associated with a driver to direct the driver to the geographic location of the client computing device to fulfill the transportation request.

2. The computer-implemented method of claim 1, wherein the updating of the corresponding locations comprises:
    receiving, via the communication session from the server computing device, a third packet comprising third data indicative of the updated locations of the geographically-positioned entities; and
    presenting, via the GUI based on the third data, the additional icons at a plurality of updated coordinates on the map, wherein the plurality of updated coordinates are representative of the updated locations of the geographically-positioned entities on the map.

3. The computer-implemented method of claim 1, wherein the receiving of the transportation ordering input comprises receiving a selection of one icon of the additional icons and generating, based on the selection, the transportation request to order transportation from one of the geographically-positioned entities to a particular location.

4. The computer-implemented method of claim 3, wherein the at least one of the demonstration request or the transportation request indicates the geographic location of the client computing device.

5. The computer-implemented method of claim 1, further comprising:
    displaying one or more range indicators on the GUI.

6. The computer-implemented method of claim 5, wherein the one or more range indicators comprise one or more concentric circles.

7. The computer-implemented method of claim 6, wherein the first icon is located at a center of the one or more concentric circles.

8. A client computing device comprising:
a memory;
a display device;
a network interface device to establish a communication session with a server computing device;
a processing device communicably coupled to the memory, the display device, and the network interface device, the processing device to:
transmit, via the communication session, a first packet comprising first data indicative of a geographic location of the client computing device;
receive, via the communication session from the server computing device, a second packet comprising second data indicative of geographic locations of geographically-positioned entities;
render, via the display device, a graphical user interface (GUI) comprising a map of a geographical area inclusive of the geographic location of the client computing device;
present, via the GUI based on the first data, a first icon at a first coordinate on the map, wherein the first coordinate is representative of the geographic location of the client computing device;
present, via the GUI based on the second data, additional icons at other coordinates on the map, wherein the other coordinates are representative of the geographic locations of the geographically-positioned entities on the map;
update, via the GUI, corresponding locations of the additional icons responsive to receiving an indication of updated locations of the geographically-positioned entities;
receive, via the GUI, transportation ordering input comprising at least one of a demonstration request or a transportation request;
responsive to the transportation ordering input comprising the demonstration request, present, via the GUI, a simulation of a transportation entity, the simulation utilizing the geographic location of the client computing device; and
responsive to the transportation ordering input comprising the transportation request, provide the transportation request to the server computing device, wherein the server computing device is to transmit instructions to a driver device associated with a driver to direct the driver to the geographic location of the client computing device to fulfill the transportation request.

9. The client computing device of claim 8, wherein to update the corresponding locations, the processing device is to:
receive, via the communication session from the server computing device, a third packet comprising third data indicative of the updated locations of the geographically-positioned entities; and
present, via the GUI based on the third data, the additional icons at a plurality of updated coordinates on the map, wherein the plurality of updated coordinates are representative of the updated locations of the geographically-positioned entities on the map.

10. The client computing device of claim 8, wherein to receive the transportation ordering input, the processing device is to receive a selection of one icon of the additional icons and generate, based on the selection, the transportation request to order transportation from one of the geographically-positioned entities to a particular location.

11. The client computing device of claim 10, wherein the at least one of the demonstration request or the transportation request indicates the geographic location of the client computing device.

12. The client computing device of claim 8, wherein the processing device is further to display one or more range indicators on the GUI.

13. The client computing device of claim 12, wherein the one or more range indicators comprise one or more concentric circles.

14. The client computing device of claim 13, wherein the first icon is located at a center of the one or more concentric circles.

15. A non-transitory machine-readable storage medium including data that, when accessed by a processing device, cause the processing device to perform operations comprising:
establishing, by a network interface device of a client computing device, a communication session with a server computing device;
transmitting, by the processing device of the client computing device via the communication session, a first packet comprising first data indicative of a geographic location of the client computing device;
receiving, via the communication session from the server computing device, a second packet comprising second data indicative of geographic locations of geographically-positioned entities;
rendering, by the processing device via a display device of the client computing device, a graphical user interface (GUI) comprising a map of a geographical area inclusive of the geographic location of the client computing device;
presenting, via the GUI based on the first data, a first icon at a first coordinate on the map, wherein the first coordinate is representative of the geographic location of the client computing device;
presenting, via the GUI based on the second data, additional icons at other coordinates on the map, wherein the other coordinates are representative of the geographic locations of the geographically-positioned entities on the map;
updating, via the GUI, corresponding locations of the additional icons responsive to receiving an indication of updated locations of the geographically-positioned entities;
receiving, via the GUI, transportation ordering input comprising at least one of a demonstration request or a transportation request;
responsive to the transportation ordering input comprising the demonstration request, presenting, via the GUI, a simulation of a transportation entity, the simulation utilizing the geographic location of the client computing device; and
responsive to the transportation ordering input comprising the transportation request, providing, to the server computing device, the transportation request, wherein the server computing device is to transmit instructions to a driver device associated with a driver to direct the driver to the geographic location of the client computing device to fulfill the transportation request.

16. The non-transitory machine-readable storage medium of claim 15, wherein the updating of the corresponding locations comprises:
- receiving, via the communication session from the server computing device, a third packet comprising third data indicative of the updated locations of the geographically-positioned entities; and
- presenting, via the GUI based on the third data, the additional icons at a plurality of updated coordinates on the map, wherein the plurality of updated coordinates are representative of the updated locations of the geographically-positioned entities on the map.

17. The non-transitory machine-readable storage medium of claim 15, wherein the receiving of the transportation ordering input comprises receiving a selection of one icon of the additional icons and generating, based on the selection, the transportation request to order transportation from one of the geographically-positioned entities to a particular location.

18. The non-transitory machine-readable storage medium of claim 15, wherein the operations further comprise displaying one or more range indicators on the GUI.

19. The non-transitory machine-readable storage medium of claim 18, wherein the one or more range indicators comprise one or more concentric circles.

20. The non-transitory machine-readable storage medium of claim 19, wherein the first icon is located at a center of the one or more concentric circles.

* * * * *